(12) United States Patent
Wu

(10) Patent No.: US 10,889,349 B2
(45) Date of Patent: Jan. 12, 2021

(54) PIVOTABLE LEVER FOR BIKES OR THE LIKE

(71) Applicant: Judy Wu, Changhua County (TW)

(72) Inventor: Judy Wu, Changhua County (TW)

(*) Notice: Subject to any disclaimer, the term of this patent is extended or adjusted under 35 U.S.C. 154(b) by 7 days.

(21) Appl. No.: 16/398,675

(22) Filed: Apr. 30, 2019

(65) Prior Publication Data
US 2020/0346711 A1 Nov. 5, 2020

(51) Int. Cl.
*B62K 23/06* (2006.01)
*B62L 3/02* (2006.01)
*G05G 1/04* (2006.01)
*G05G 5/05* (2006.01)

(52) U.S. Cl.
CPC ............. *B62K 23/06* (2013.01); *B62L 3/02* (2013.01); *G05G 1/04* (2013.01); *G05G 5/05* (2013.01)

(58) Field of Classification Search
CPC .. B62L 3/02; B62L 3/026; G05G 1/04; G05G 5/05; B62K 23/00; B62K 23/02; B62K 23/06
See application file for complete search history.

(56) References Cited

U.S. PATENT DOCUMENTS

| | | | |
|---|---|---|---|
| 9,650,102 B1* | 5/2017 | Wu | B62K 23/06 |
| 10,145,143 B1* | 12/2018 | Mohammed | E05C 17/56 |
| 2012/0006146 A1* | 1/2012 | Warren | B62K 23/06 74/524 |
| 2017/0129567 A1* | 5/2017 | Snead | B62L 3/02 |
| 2020/0003580 A1* | 1/2020 | Iwata | F16H 59/105 |

* cited by examiner

Primary Examiner — Prasad V Gokhale

(57) ABSTRACT

A pivotable lever includes a seat and a ball part is connected to the seat. The ball part has a first magnet received therein which includes a first magnetic pole. A lever includes a ball-shaped hole in which the ball part is located. The lever is pivotable relative to the ball part and the seat such that the lever is prevented from being damaged or broken due to impact. A second magnet is connected to the inner periphery of the ball-shaped hole which includes a second magnetic pole. The first and second magnetic poles are magnetically opposite to each other. The lever returns to its initial position thereof by magnetic attraction of the first and second magnetic poles.

7 Claims, 9 Drawing Sheets

PIVOTABLE LEVER FOR BIKES OR THE LIKE

BACKGROUND OF THE INVENTION

1. Fields of the Invention

The present invention relates to a lever for a bile, and more particularly, to a pivotable lever that is pivotable when being hit so as to prevent the lever from being broken.

2. Descriptions of Related Art

The conventional brake lever or clutch lever of a bike of a motorbike is secured to the handle and can only be gripped to operate the brake cable or to activate the clutch. However, when the lever is hit by a foreign force from a direction that is different from the gripping direction, the lever can be damaged, deformed or broken. An existed pivotable lever is cooperated with two torsion springs which are respectively connected to a seat and a protrusion. When the lever is hit from one direction, the first torsion is in action, and when the lever is hit from another one direction, the second torsion is in action so that the lever is pivotable in different directions to prevent the lever from being damaged. In other words, there are two different mechanism required to achieve the protection purpose to the lever.

The present invention intends to provide a pivotable lever that uses a ball part to provide pivotable feature of the lever, and the lever returns to its initial position by using two magnets.

SUMMARY OF THE INVENTION

The present invention relates to a pivotable lever and comprises a seat. A ball part is connected to the seat and has a first magnet which includes a first magnetic pole on the first end thereof. A lever has a second magnet connected thereto. The second magnet includes a second magnetic pole formed on the first end thereof. The first and second magnetic poles are magnetically opposite to each other. The lever includes a ball-shaped hole defined in the first end thereof. The ball part is located in the ball-shaped hole, so that the lever is pivotable relative to the ball part and the seat. The lever returns to an initial position thereof by magnetic attraction of the first and second magnetic poles.

The primary object of the present invention is to provide a lever that is pivotable relative to the seat, and the lever returns to its initial positions by two magnets respectively located in the ball-shaped part and the lever.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
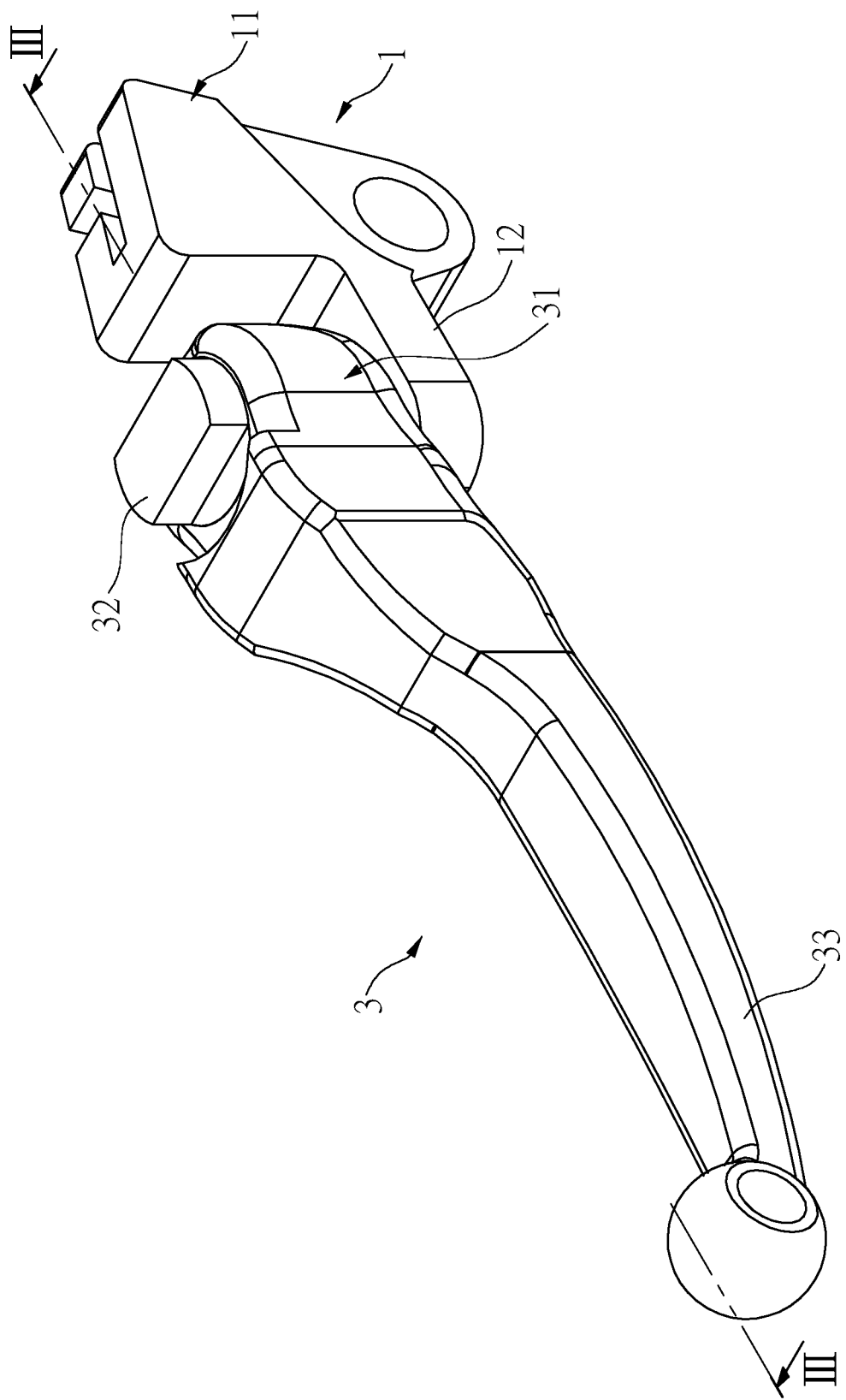
FIG. 1 is a perspective view to show the pivotable lever of the present invention.
Figure 2:
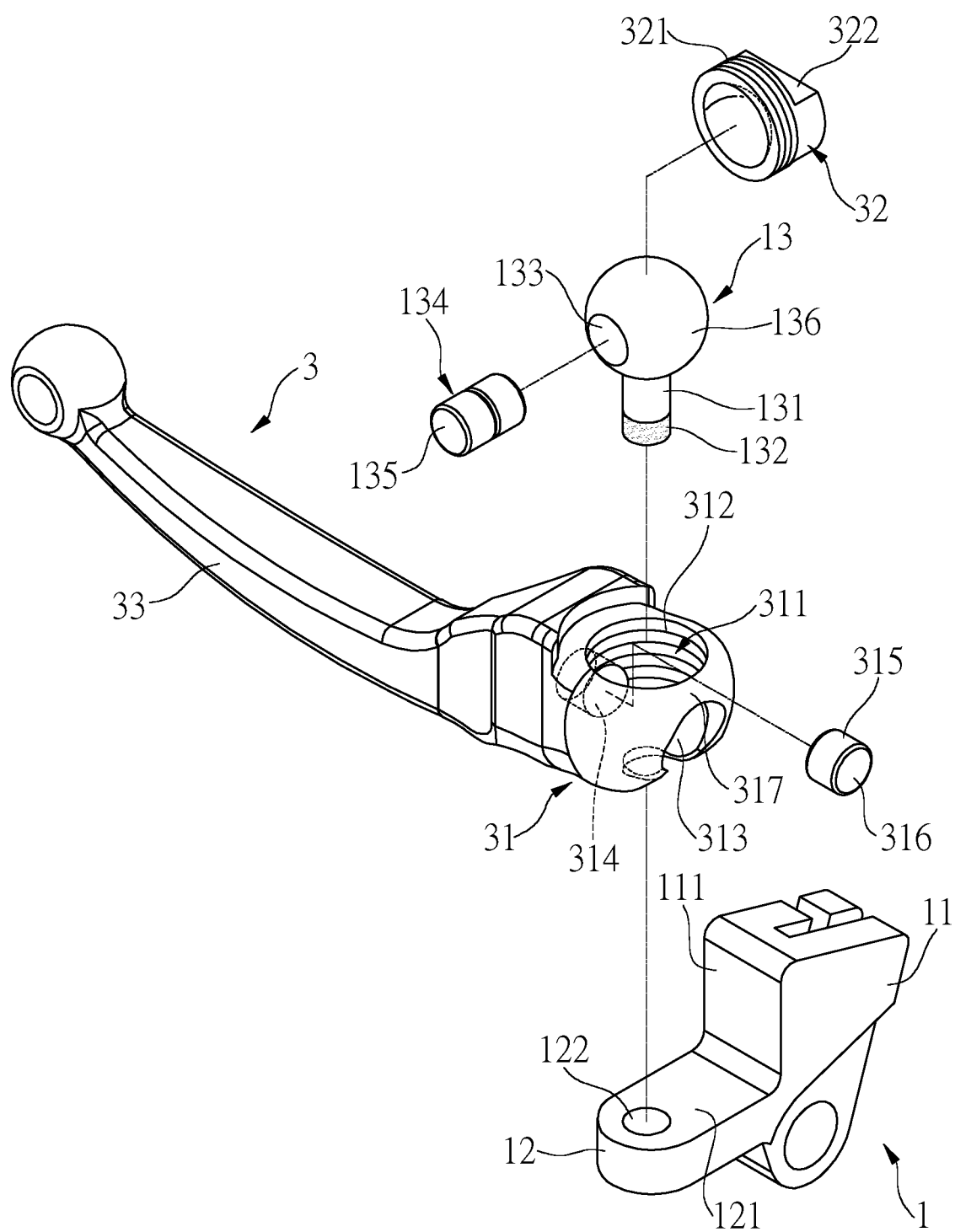
FIG. 2 is an exploded view of the pivotable lever of the present invention.

Referring to FIGS. 1 to 8, the pivotable lever of the present invention comprises a seat 1, a ball part 13 and a lever 3. The seat 1 includes an installation portion 11 and a connection portion 12 which is formed with the installation portion 11. The installation portion 11 is adapted to be installed to a bike or a motorbike (not shown), and is connected with a braking system or a clutch (not shown). The installation portion 11 includes a first face 111. The connection portion 12 includes a second face 121, and an angle is formed between the first and second faces 111, 121.

The ball part 13 is connected to the second face 121 of the seat 1, and has a first recess 133 defined radially therein. A first magnet 134 is located in the first recess 133. The first magnet 134 includes a first magnetic pole 135 on the first end thereof. Specifically, the ball part 13 includes a ball 136 and an extension 131 which extends radially from the ball 136. The extension 131 includes a fixing portion 132, the extension 131 is inserted into a bore 122 defined in the connection portion 12 via the ball-shaped hole 311 which will be described later. The fixing portion 132 is fixed to the bore 122.

The lever 3 includes a connection end 31 and a grip portion 33 which extends from the connection end 31. The ball-shaped hole 311 is defined through the connection end 31 on the first end of the lever 3, and the ball part 13 located in the ball-shaped hole 311. A gap is formed between the first face 111 and the connection end 31, and between the second face 121 and the connection end 31 such that the lever 3 is allowed to be pivotable relative to the seat 1. A second recess 314 is defined in the inner periphery of the ball-shaped hole 311, and a second magnet 315 is located in the second recess 134. The second magnet 315 includes a second magnetic pole 316 on the first end thereof. When the first and second recesses 133, 314 are located corresponding to each other, the first and second magnetic poles 135, 316 being magnetically opposite to each other. The first magnetic pole 135 and the second magnetic pole 315 are magnetically attracted with each other. The lever 3 is pivotable relative to the ball part 13 and the seat 1. The lever 3 returns to its initial position by magnetic attraction of the first and second magnetic poles 135, 316.

The connection end 31 includes an initial face 317 which is located corresponding to the first face 111 when the first and second magnets 134, 315 are magnetically attracted to each other.

The connection end 31 includes a through hole 313 defined in the initial face 317 and communicates with the ball-shaped hole 311 and an opening of the ball-shaped hole 311 that is formed through the first end of the connection end 31. The through hole 313 restricts movement of the extension 131 when the lever 3 is pivoted relative to the seat 1.

Figure 9:
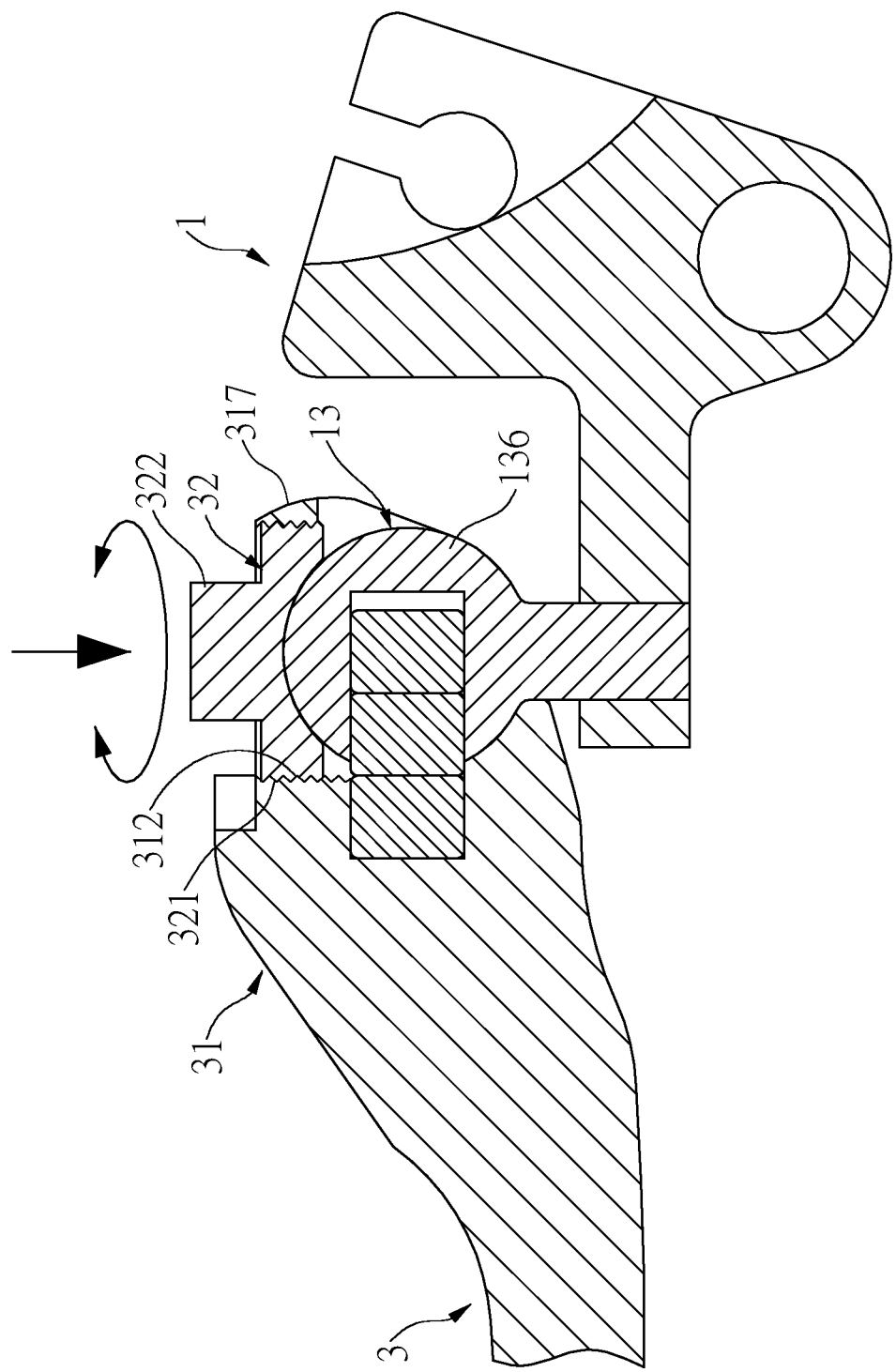
FIG. 9 shows that the cap is rotated to press the ball-shaped part.

A cap 32 is connected to the ball-shaped hole 311 from another opening formed in the second end of the connection end 31 so as to close the ball-shaped hole 311. The ball part 13 is located between the cap 32 and the ball-shaped hole 311. Specifically, the cap 32 includes first threads 321 defined in the outside thereof. The ball-shaped hole 311 includes second threads 312 defined in the inner periphery of the ball-shaped hole 311. The second threads 321 of the cap 32 are threadedly connected to the first threads 321. The cap 32 includes an operation portion 322 extending therefrom so that the users may operate the operation portion 322 to rotate the cap 32, so that the ball part 13 is pressed by inside of the cap 32. By rotating the cap 32, the level that ball the part 13 is pressed by the cap 32 can be adjusted as shown in FIG. 9.

Figure 3:
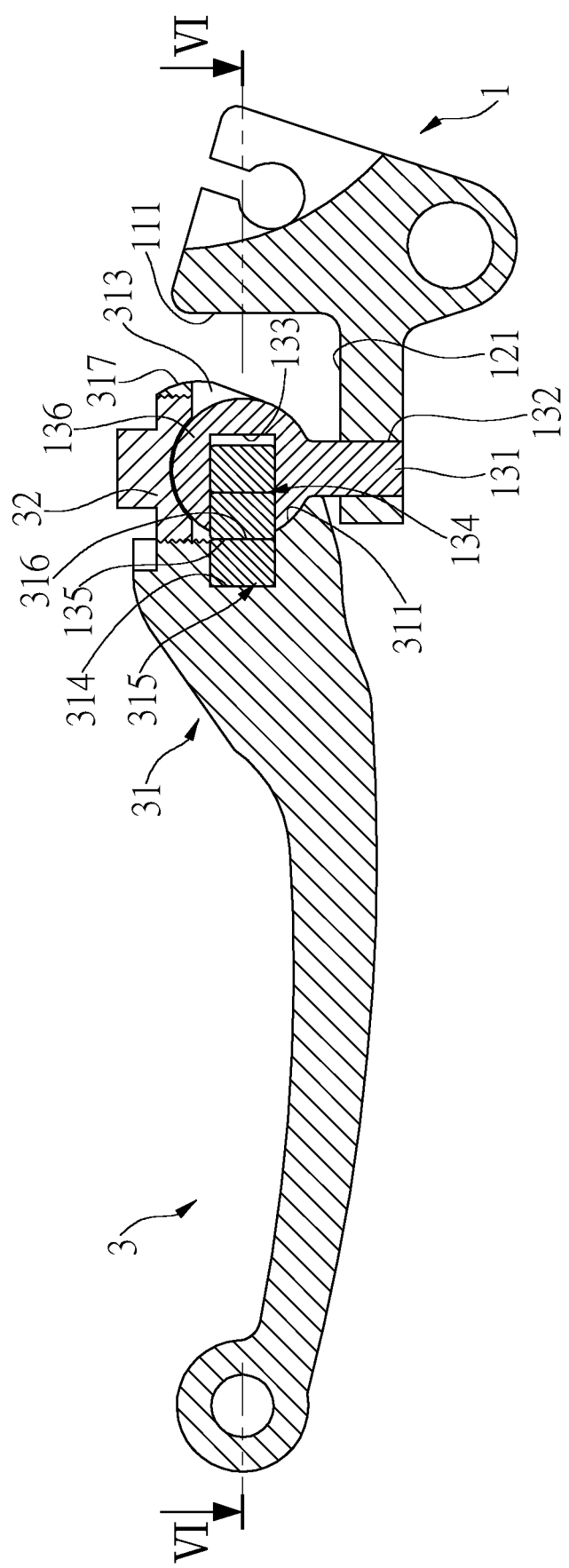
FIG. 3 is a cross sectional view, taken along line III-III in FIG. 1.
Figure 4:
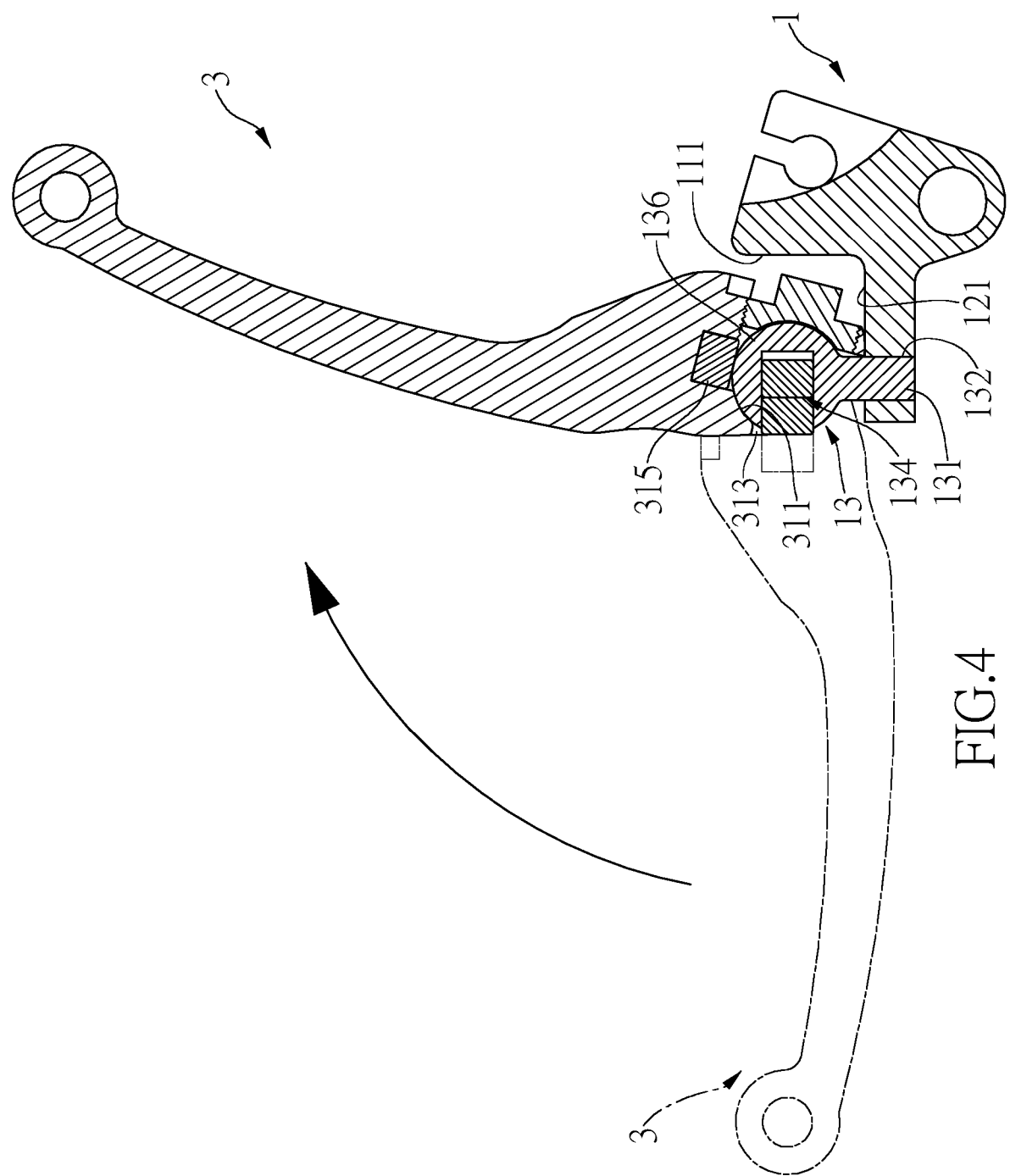
FIG. 4 shows that the lever is pivoted relative to the seat.
Figure 6:
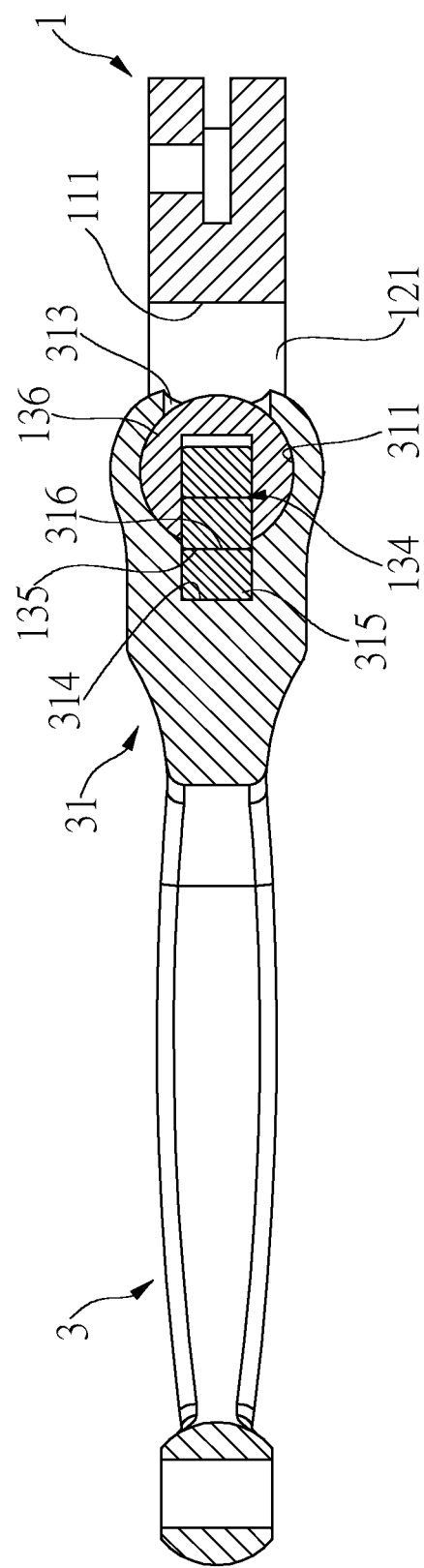
FIG. 6 is a cross sectional view, taken along line VI-VI in FIG. 3.
Figure 7:
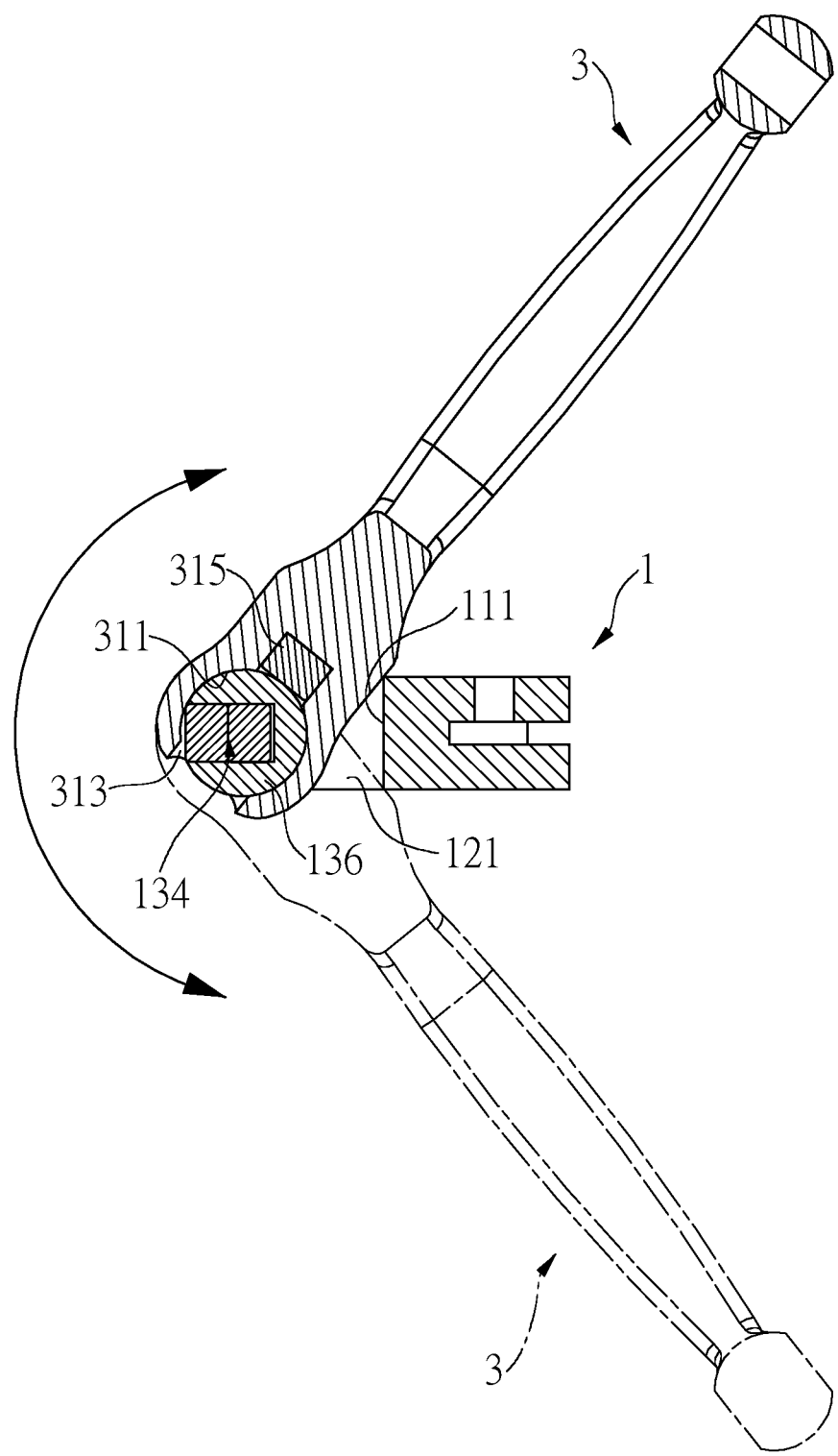
FIG. 7 is another view to show that the lever is pivoted relative to the seat.
Figure 8:
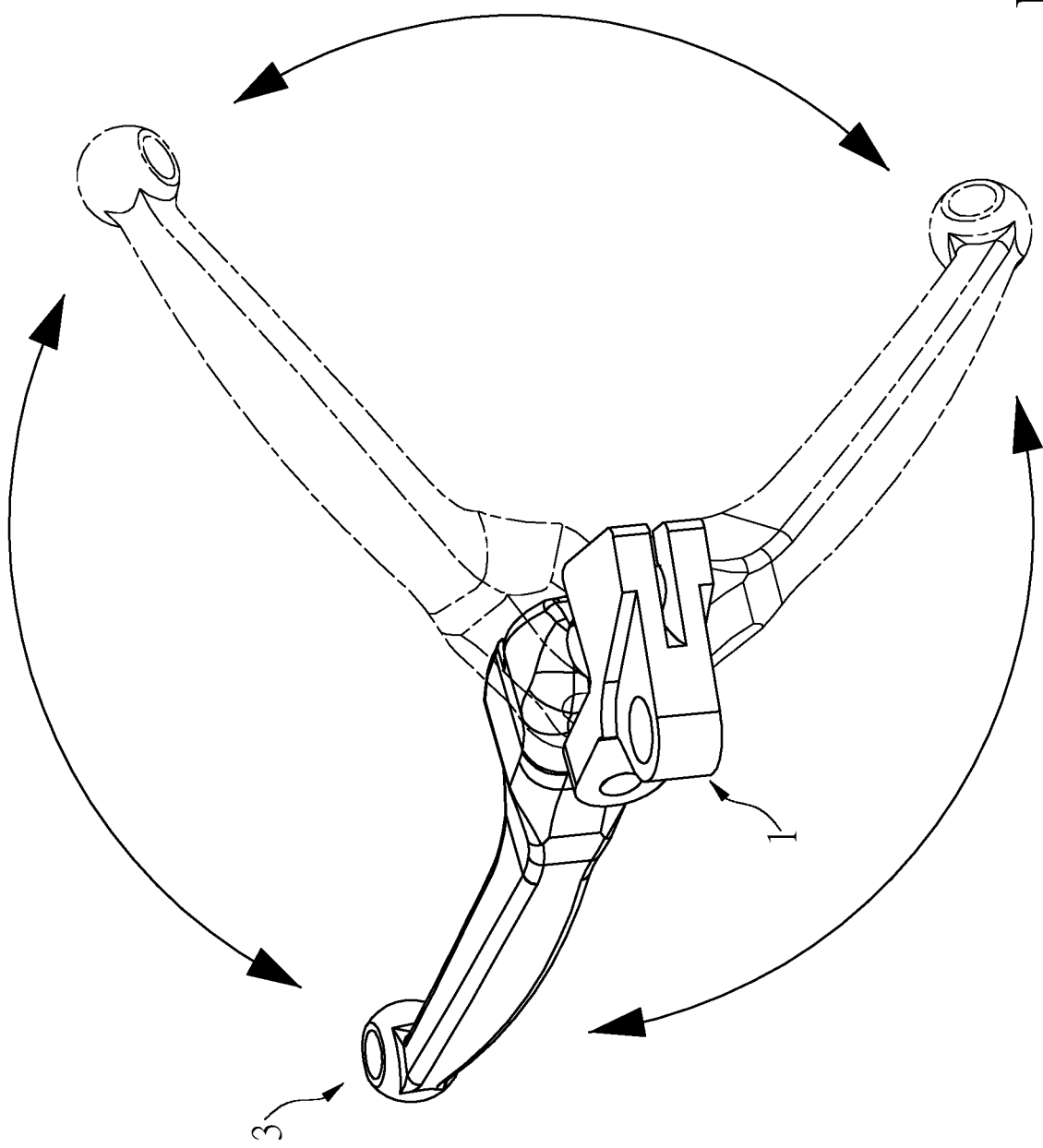
FIG. 8 is a perspective view to show that the lever is pivoted relative to the seat.

As shown in FIGS. 1, 3 and 6, the lever 3 is in its original position while the first and second magnetic poles 135, 316 are magnetically attracted to each other. In the original position, the user can grip the grip portion 33 to operate the brake system or the clutch. When a foreign force is applied to the lever 3, for example, the lever 3 is hit by a tree or the like, the lever 3 is pivoted relative to the seat 1, as shown in FIGS. 4, 7 and 8, such that the lever 3 is prevented from being damaged or broken.

Figure 5:
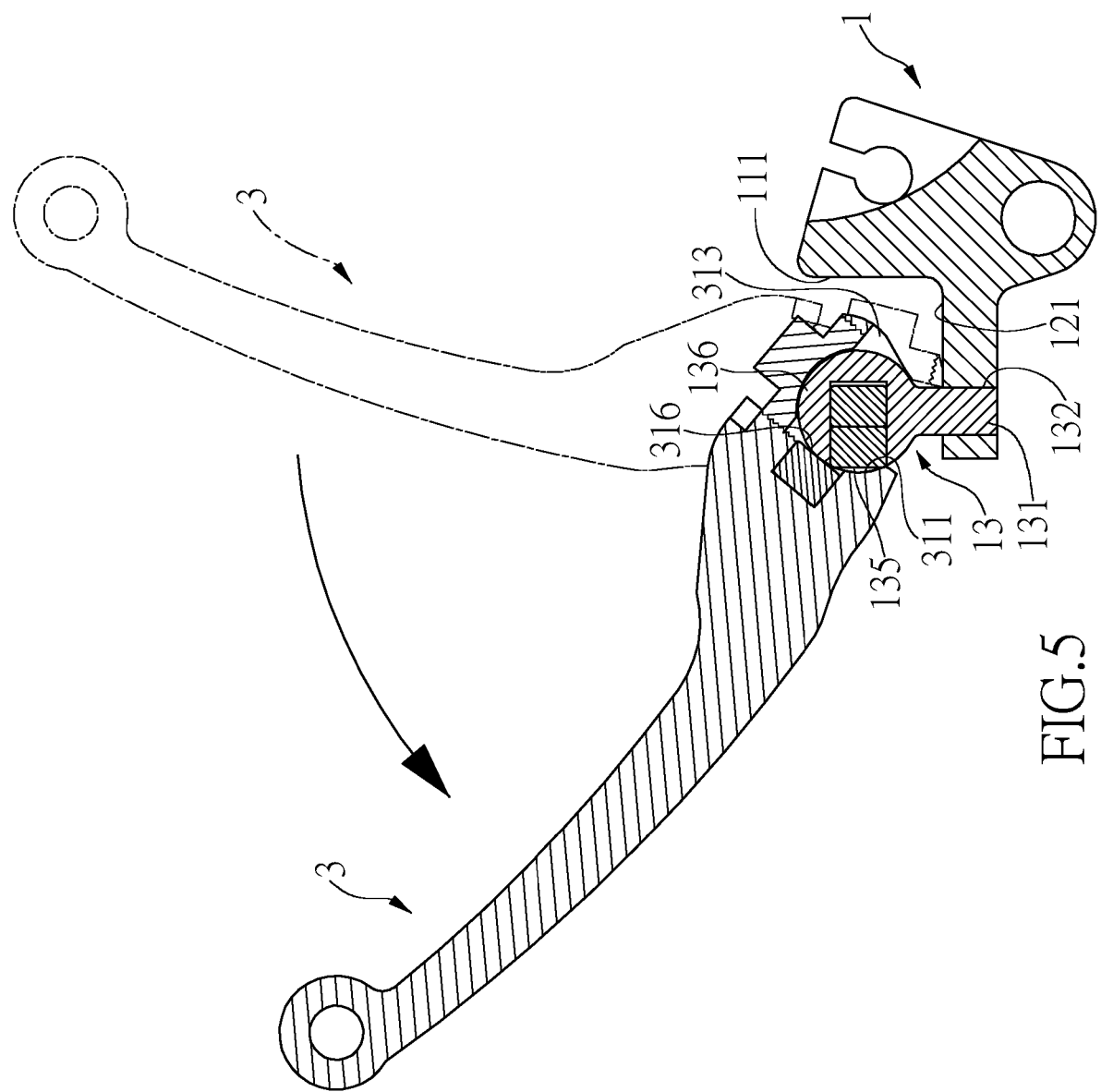
FIG. 5 shows that the lever returns to its initial positions by the two magnets respectively located in the ball-shaped part and the lever.

After the foreign force disappears, as shown in FIG. 5, the lever 3 returns to its original position by magnetic attraction of the first and second magnetic poles 135, 316.

While we have shown and described the embodiment in accordance with the present invention, it should be clear to those skilled in the art that further embodiments may be made without departing from the scope of the present invention.

What is claimed is:

1. A pivotable lever comprising:
   a seat;
   a ball part connected to the seat, the ball part having a first magnet which includes a first magnetic pole on a first end thereof, and
   a lever having a second magnet connected thereto, the second magnet having a second magnetic pole on a first end thereof, the first and second magnetic poles being magnetically opposite to each other, the lever including a ball-shaped hole defined in the first end thereof, the ball part located in the ball-shaped hole, the lever being pivotable relative to the ball part and the seat, the lever returning to an initial position thereof by magnetic attraction of the first and second magnetic poles.

2. The pivotable lever as claimed in claim 1, wherein the seat includes an installation portion and a connection portion which is formed with the installation portion, the installation portion includes a first face, the connection portion includes a second face, the ball part connected to the second face, an angle is formed between the first and second faces.

3. The pivotable lever as claimed in claim 2, wherein the lever includes a connection end and a grip portion which extends from the connection end, the ball-shaped hole is defined through the connection end, a gap is formed between the first face and the connection end, and between the second face and the connection end such that the lever is pivotable relative to the seat, the connection end includes an initial face which is located corresponding to the first face when the first and second magnets are magnetically attracted to each other.

4. The pivotable lever as claimed in claim 3, wherein the connection end includes a through hole defined in the initial face and communicates with the ball-shaped hole and an opening of the ball-shaped hole that is formed through a first end of the connection end, the second face of the connection portion includes a bore, the ball part includes a ball and an extension which extends radially from the ball, the extension includes a fixing portion, the extension is inserted into the bore via the ball-shaped hole, the fixing portion is fixed to the bore, the through hole restricts movement of the extension.

5. The pivotable lever as claimed in claim 4, wherein the ball part includes a first recess defined radially therein, the first magnet is located in the first recess, a second recess is defined in an inner periphery of the ball-shaped hole, the second magnet is located in the second recess, the first magnetic pole and the second magnetic pole are magnetically attracted with each other when the first and second recesses are located corresponding to each other.

6. The pivotable lever as claimed in claim 1, wherein the lever includes a connection end and a grip portion which extends from the connection end, the ball-shaped hole is defined through the connection end, a cap is connected to the ball-shaped hole of the connection end so as to close the ball-shaped hole, the ball part is located between the cap and the ball-shaped hole.

7. The pivotable lever as claimed in claim 6, wherein the cap includes first threads, the ball-shaped hole includes second threads which are threadedly connected to the first threads, the cap includes an operation portion extending therefrom and is operated to rotate the cap, the ball part is pressed by inside of the cap.

\* \* \* \* \*